United States Patent
Washburn

(10) Patent No.: US 7,182,104 B2
(45) Date of Patent: Feb. 27, 2007

(54) COLLAPSIBLE DUCT

(75) Inventor: Robert B. Washburn, Amherst, OH (US)

(73) Assignee: Arnco Corporation, Elyria, OH (US)

( * ) Notice: Subject to any disclaimer, the term of this patent is extended or adjusted under 35 U.S.C. 154(b) by 203 days.

(21) Appl. No.: 10/865,085

(22) Filed: Jun. 10, 2004

(65) Prior Publication Data

US 2004/0222410 A1 Nov. 11, 2004

Related U.S. Application Data

(63) Continuation-in-part of application No. 10/079,295, filed on Feb. 20, 2002, now Pat. No. 6,796,547.

(51) Int. Cl.
*F16L 11/00* (2006.01)

(52) U.S. Cl. ............... 138/118; 138/119; 138/110; 138/108; 220/720

(58) Field of Classification Search ........... 138/118, 138/119, 110, 108; 220/720, 723; 254/134.3 FT
See application file for complete search history.

(56) References Cited

U.S. PATENT DOCUMENTS

| | | | | |
|---|---|---|---|---|
| 3,032,151 A | * | 5/1962 | Allen et al. ............... 52/108 |
| 3,173,196 A | | 3/1965 | Grimm ............... 29/890.036 |
| 3,201,861 A | | 8/1965 | Fromson et al. ......... 138/114 X |
| 3,343,567 A | * | 9/1967 | Mulligan et al. ............ 138/119 |
| 3,364,632 A | * | 1/1968 | Isaac ......................... 52/2.22 |
| 3,374,806 A | * | 3/1968 | Skinner ...................... 138/119 |
| 3,508,587 A | * | 4/1970 | Mauch ........................ 138/119 |
| 3,569,875 A | * | 3/1971 | Paine et al. ................. 333/243 |
| 3,581,778 A | * | 6/1971 | Korejwa et al. ............ 138/119 |
| 3,749,133 A | * | 7/1973 | Bochory ..................... 138/119 |
| 3,828,473 A | * | 8/1974 | Morey ....................... 47/58.1 R |
| 4,009,734 A | * | 3/1977 | Sullivan ..................... 138/125 |
| 4,385,021 A | | 5/1983 | Neeley .................. 264/171.11 |
| 4,478,661 A | * | 10/1984 | Lewis ......................... 156/92 |
| 4,565,351 A | | 1/1986 | Conti et al. ............. 138/108 X |
| 4,588,459 A | | 5/1986 | Zwilling ....................... 156/85 |
| 4,709,730 A | | 12/1987 | Zwilling ....................... 138/111 |
| 4,745,238 A | | 5/1988 | Kotthaus et al. ............ 174/101.5 |
| 4,804,020 A | | 2/1989 | Bartholomew ............... 138/111 |
| 5,027,864 A | | 7/1991 | Conti et al. ................. 138/177 |
| 5,087,153 A | | 2/1992 | Washburn ................ 405/183.5 |
| 5,172,765 A | | 12/1992 | Sas-Jaworsky et al. ..... 166/384 |

(Continued)

FOREIGN PATENT DOCUMENTS

FR 1417987 * 10/1965

*Primary Examiner*—Patrick F. Brinson
(74) *Attorney, Agent, or Firm*—Pearne & Gordon LLP

(57) ABSTRACT

A duct for containing a cable and method for mounting the cable therein include providing the duct with a collapsible or flexible wall movable between a contracted condition for mounting the duct in a conduit and an extended condition of increased cross-sectional area for inserting a cable in the duct. The duct is moved to its extended condition by an applied internal pressure and, after the cable has been inserted, the duct is returned to its contracted condition. The duct has a multiple layer construction: an inner layer, an outer protective layer and a reinforcing layer between them. There may be frictional reducing ribs on the inner and/or outer layer in order to reduce the forces necessary to place the duct and/or the cable. Alternatively, the duct may have a single, thin layer.

29 Claims, 5 Drawing Sheets

U.S. PATENT DOCUMENTS

| | | |
|---|---|---|
| 5,271,433 A | 12/1993 | Schwert et al. .............. 138/98 |
| 5,335,872 A | 8/1994 | Clubbs ................... 242/610.6 |
| 5,349,989 A | 9/1994 | Legallais ................... 138/111 |
| 5,395,472 A | 3/1995 | Mandich .................... 156/287 |
| 5,678,609 A | 10/1997 | Washburn .................. 138/107 |
| 5,810,053 A | 9/1998 | Mandich ..................... 138/98 |
| 5,813,658 A | 9/1998 | Kaminski et al. ........ 254/134.4 |
| 5,922,995 A | 7/1999 | Allen .......................... 174/95 |

* cited by examiner

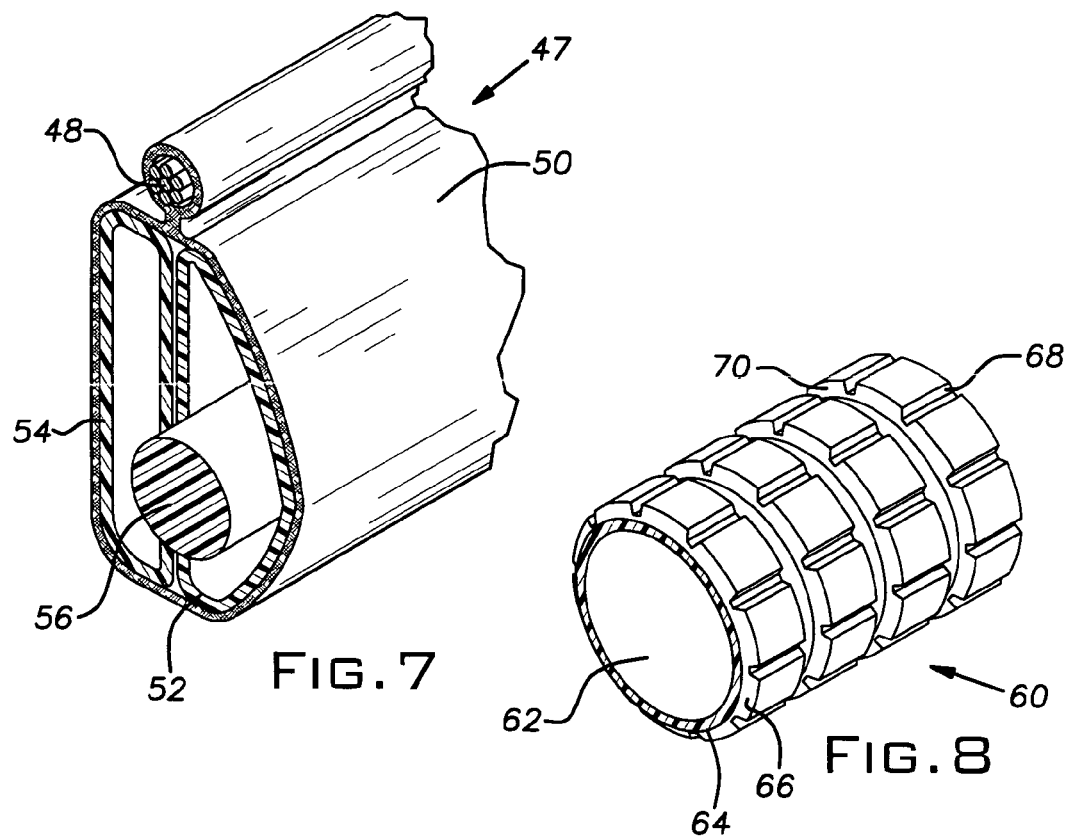
FIG. 7
FIG. 8
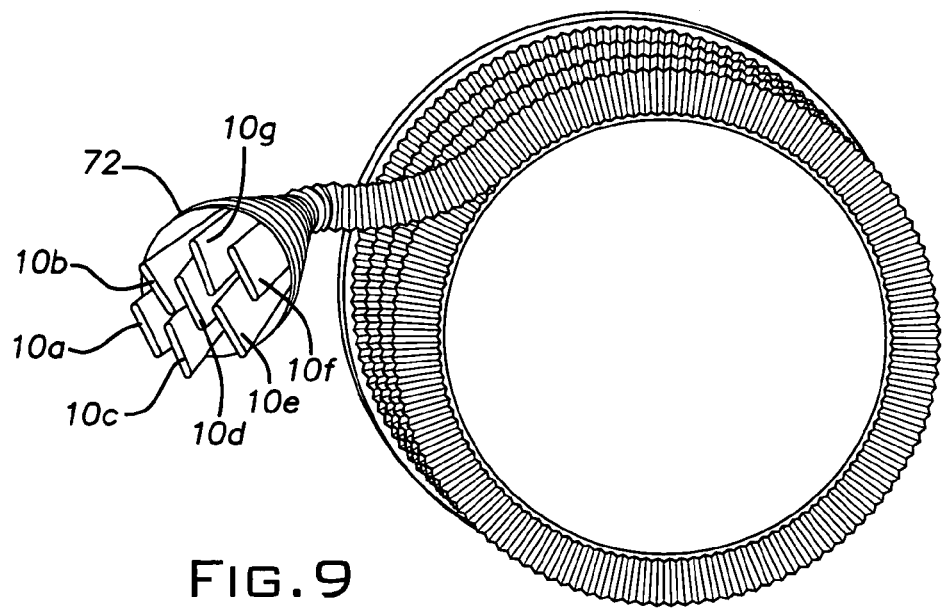
FIG. 9

COLLAPSIBLE DUCT

This application is a continuation-in-part of U.S. patent application Ser. No. 10/079,295, filed Feb. 20, 2002 now U.S. Pat. No. 6,796,547.

BACKGROUND OF THE INVENTION

The present invention relates to ducts for containing cables, such as optical cables, and to methods for mounting such ducts in an enclosure or conduit.

In the telecommunications industry it is common practice to string cable through a duct, which has previously been placed in an outer conduit. The cable may be electrical, optical or any other type. In recent years, data transmission through optical cable has vastly expanded. As a result, there has been a great increase in demand for cable to carry the digital data. Existing conduits, both above and below ground, have been utilized for new ducts and cables. The old contents of the conduit, usually electrical cable, are removed and ducts are installed, through which optical cables are subsequently placed. U.S. Pat. Nos. 5,027,864 and 4,565,351, the contents of which are hereby incorporated by reference, are examples of this.

Existing conduits have a limited amount of interior space. Further, the conduits may extend along a tortuous path characterized by multiple bends and adjacent length portions extending in non-planar directions. They are usually circular in cross section and often are buried or otherwise not readily accessible. The ducts, which are placed in the conduits, usually have relatively rigid, circular cross-sections but are flexible along their length. Consequently, multiple ducts are difficult, if not impossible, to insert within conduits in some cases.

Using circular duct in a circular conduit is an inefficient utilization of space. That is, there is a considerable amount of wasted space between the circular ducts. For example, a conduit with a 4" internal diameter would hold only three ducts with a nominal 1¼" internal diameter. This inefficient use of the conduit interior space or cross-sectional area corresponds with a low packing efficiency.

In further efforts to achieve cable installation efficiencies, consideration has been given to the mounting or stringing of cable within existing utility service lines such as gas or water lines. Such an installation technique would provide a low-cost cable pathway to a home or business. However, such utility service lines are typically not oversized for the volume of water or gas that they are intended to deliver and may only range in diameter from one to several inches. Accordingly, even though the cable conduit may be small in diameter, it would still occupy a significant volume and cross-sectional area of the service line and tend to interfere with the utility delivery.

SUMMARY OF THE INVENTION

In accordance with the present invention, ducts having a variable cross-sectional configuration provide pathways for cables. The variable cross-sectional configuration of the duct facilitates mounting of the duct in an enclosure or conduit and also enables increased numbers of ducts to be mounted in a given size conduit. The cable may be inserted in the duct prior to or after the duct is mounted within the enclosure or conduit.

The cross-sectional configuration of the duct may be varied between an extended condition of greater cross-sectional area and a contracted condition of lesser cross-sectional area. Typically, the duct is normally in the contracted condition and is manipulated to the extended condition as by fluid pressure.

The facilitating of duct mounting in a conduit relates to the reduced cross-sectional area of the duct in the contracted condition and also to the reduced cross-sectional profile of the contracted duct as well as the increased duct flexibility or conformability provided by the collapsible duct wall. That is, the varied degrees of duct bending required as the duct is moved along a tortuous path are more readily accommodated by the variable cross-sectional configuration and collapsible wall of the duct.

This invention includes a method of installing a cable in an inner pathway or duct. The duct has a collapsible wall which is movable between an extended condition and a contracted condition. The extended condition has a greater cross sectional area than the contracted condition. The duct is inserted, in the contracted condition, into an outer conduit. The duct is moved to the extended condition and the cable is inserted into the duct. The duct is subsequently moved to the contracted condition. The duct may also be used without an outer conduit.

This invention further includes a duct providing a pathway for a cable. The duct includes a collapsible wall movable between an extended condition and a contracted condition wherein the extended condition has a greater cross-sectional area than the contracted position. When the duct is in the extended condition it is suitable to have a cable passed through it longitudinally. When the duct is in the contracted position it may be placed in a conduit in greater numbers than an equivalent size of a non-collapsible duct. In one embodiment of this invention, a thin wall collapsible duct allows much greater numbers of ducts to be placed in conduits than ever before.

This invention greatly enhances the efficiency of existing conduits. In this invention the ducts are made of a collapsible or flexible material. While the ducts are sturdy enough to remain intact when cable is passed through them, the ducts have a normally contracted configuration of reduced cross-sectional area and, for example, they may collapse under their own weight. That is, the ducts flatten themselves unless there is a force to open them, such as air pressure. In this invention, the flattened ducts are pulled or pushed, in a flattened state, through a conduit. In a 4" internal diameter conduit there would be room for seven nominal 1¼" ID flattened ducts, if they had a wall thickness of about 0.012–0.015 inches. This is over twice the number of rigid ducts of the same size. If the ducts have a wall thickness of about 0.002", as in one embodiment of this invention, about 48 tubes could be placed in a conduit of 1½" diameter.

When it is desired to place a cable in the duct, the duct is simply inflated. A source of air pressure, usually an air compressor, is connected to one end of the duct. The air pressure causes the duct to inflate to an expanded oval or circular cross section sufficiently large to permit a cable to pass through it. After the cable is inserted, that duct is deflated and another one is inflated. This process continues until all of the ducts have had a cable placed in them. The increase in capacity and efficiencies from this invention are obvious.

The size constraints that have heretofore inhibited the mounting of ducts in existing service lines or other pipelines are significantly lessened, if not overcome, by the collapsible ducts of the invention. That is, a greater number of cables may be contained in a smaller size duct and the cross-sectional area of the installed duct is itself reduced by collapsing the duct about the cables following installation.

In this manner, a greater number of cables may be installed in a service line or pipeline with a minimal amount of flow reduction.

BRIEF DESCRIPTION OF THE DRAWINGS

FIG. 7 is a perspective view of an alternate embodiment of this invention, including a suspension member.

FIG. 8 is a perspective view of an alternate embodiment of this invention having longitudinal and circumferential grooves.

FIG. 9 is a perspective view illustrating collapsible duct in a coiled conduit.

DETAILED DESCRIPTION OF THE DRAWINGS

Figures 1, 2:
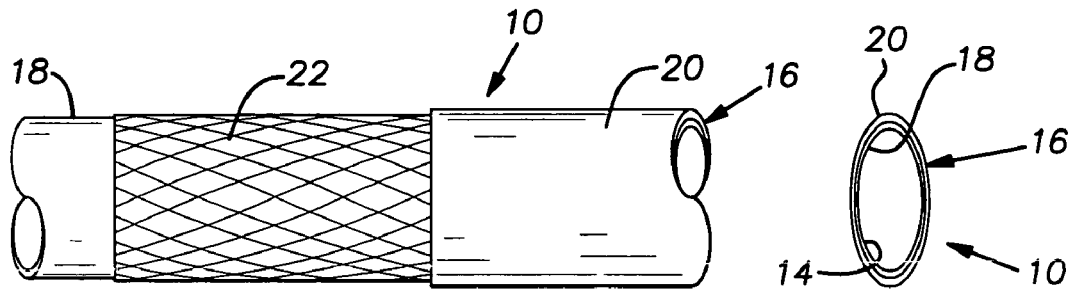
FIG. 1 is a side elevation, partly cut away, of the duct of this invention.
FIG. 2 is a front view of the duct of this invention.
Figure 3:
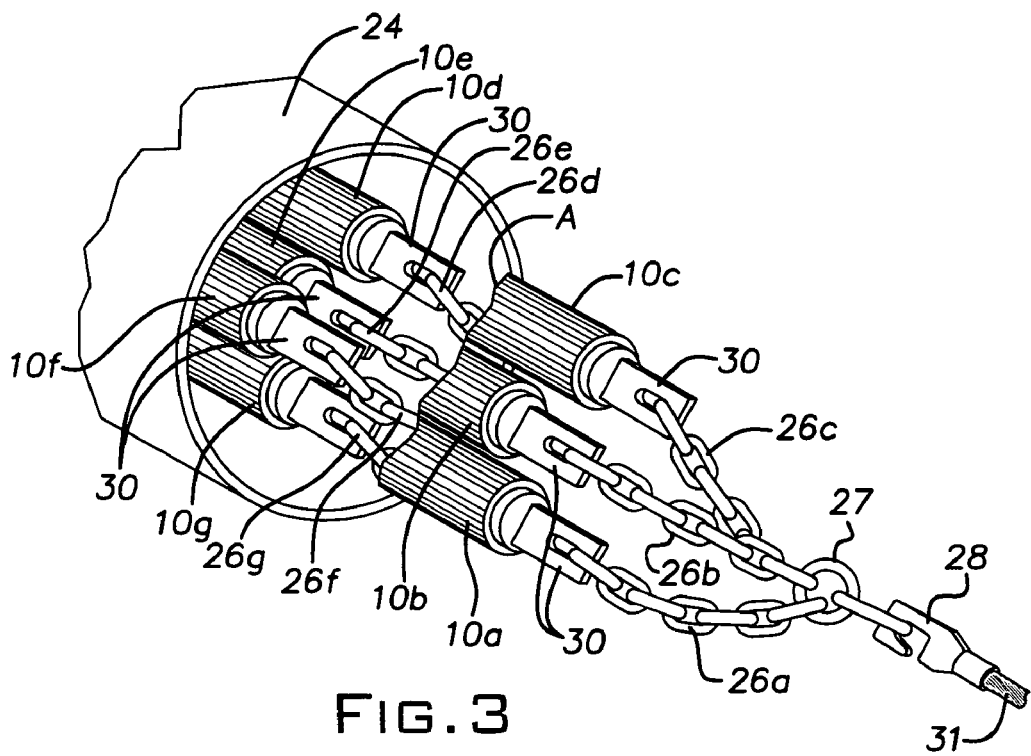
FIG. 3 is perspective view of the collapsible ducts being pulled through a conduit with parts broken away for clarity of illustration.

As best seen in FIGS. 1–3, this invention includes a duct 10 or series of ducts 10a–10g. Each duct 10 forms a pathway 14. The duct 10 has a collapsible or flexible wall 16 which has three layers: an inner layer 18, an outer layer 20 and a reinforcement layer 22 between them.

The inner layer 18 is made of a low friction abrasion resistant material that is thin and flexible. Materials that meet these criteria to one degree or another are polyolefins (polyethythylene, thermoplastic elastomers, polypropylene), polyester (polyethyleneterephthalate, polybutyleneterephthalate), polyamide (nylons), polyvinylchloride (PVC), polyvinylidene fluoride, polytetrufluoroethylene, acrylonitrile-butadiene-styrene, styrene-acrylonitrile, poly-sulfones and others known to one skilled in this art.

The outer layer 20 is made of a material that is durable and flexible. Known materials include flexibilized PVC's, urethane, thermoplastic elastomers, and silicone or vulcanized rubber compounds.

The reinforcement layer 22 must also be strong and flexible. Friction however, is not a concern. It may be made of a woven or non-woven material of organic, glass or metal fiber or bundles of same. Also, a slit-metal material of sufficient flexibility and resiliency may be used.

The reinforcement layer may be characterized by a bias ply or helical wrap arrangement to achieve the desired hoop strength and duct burst strength. The extrusion of the duct layers may provide longitudinal molecular orientation of the layer material and increased longitudinal tensile strength. However, longitudinal members may be used for added tensile strength. It should be understood that more or less layers may be used.

The duct 10 has a normally collapsed configuration of reduced cross-sectional area. The duct may be collapsible of its own weight. In the collapsed or contracted condition, the aspect ratio of the major duct dimension to the minor duct dimension (e.g. the major and minor axes of an ellipse or oval) may range from about 1.1:1 to about 50:1. Often, oval shape ratios range from about 5:1 to about 35:1.

The layers 18, 20 and 22 may be provided of the materials described herein and formed with various thicknesses selected in accordance with strength, wear and other design parameters while achieving the required flexibility or collapsibility to enable the duct to be operated between its extended and contracted conditions. The layer thickness may be varied to allow for variations in the stiffness of different construction materials. For example, layers formed of polyamides may be thinner than layers formed of polyolefins. Illustrative thicknesses for inner and outer layers formed of polyethylene may range from 0.01 to 0.2 inches. The thickness of the reinforcement layer 22 will typically be less than that of the outer layer and will range from about 0.02 to about 0.2 inches.

The duct 10 has a generally tubular shape, and the wall 16 is of a uniform construction and closed about the longitudinal axis of the duct. As described above, the construction of the wall 16 is collapsible about its entire periphery to provide increased applicability of the duct to various enclosures or conduits of restricted interior space. However, the wall 16 may include a noncollapsible portion joined to a collapsible portion to provide increased duct rigidity required in certain conduit applications characterized by less structural support.

As shown in FIG. 3, the ducts 10a–g may be pulled though a conduit 24 by chains 26a–g connected to associated ducts by plugs 30 mounted within the open end of each duct. A ring 27 connects the chains 26a–g to a hook 28 extending from a cable 31 which is often connected to a winch (not shown).

It should be appreciated that the ducts 10 are in their normally collapsed or contracted condition rearward of the plugs 30. For example, rearward of the breakline "A" extending through the lead group of ducts 10a, 10b and 10c, the downstream remaining portions of these ducts are in their normally collapsed configuration and pass alongside the expanded portions of the ducts 10d, 10e, 10f and 10g. The conduit 24 has a cross-sectional area sufficient to accommodate at least three collapsed ducts in juxtaposition with four extended ducts. The chains are different lengths in order to stagger the leading edges of the ducts 10a–g. Since the plugs 30 open the ducts to their full diameter, they may not all be pulled through the conduit 24 with the leading edges aligned and extending in the same plane. It is also possible to pull the ducts sequentially through the conduit in separate groups. The devices for pulling or pushing ducts are many, varied and well known in the art.

In the present invention, the ducts 10a–g are in a collapsed or contracted position rearward of the plugs 30 as they are drawn through the conduit 24. In the collapsed or contracted position, many more ducts can be installed in a conduit. For example, seven 1¼" collapsed ducts could be placed in a 4" ID conduit. Whereas, only 3 such ducts could be placed in a 4" conduit if the ducts had the full 1¼" circular cross-section.

In this invention, the duct 10 has an oval cross-section when it is in its normal or contracted condition as best seen in FIG. 2. It is in this contracted state when the ducts are placed in the conduit 24. After the ducts 10a–g are in place, they are expanded and cables are inserted into the ducts.

In order to move or operate the ducts to their extended state, air pressure is applied to one end of the duct. That is, air is forced into the entire length of one (or more) of the ducts to inflate or displace it to its extended condition. In its extended condition, a duct will have an expanded oval or circular cross-section. While in this condition, a cable is placed in the duct by either pushing or pulling it. After the cable is in place, the duct is returned to its contracted condition by stopping the air flow through it. This process is repeated on each of the ducts either one at a time or perhaps more until all of the ducts have a cable in them. This invention also contemplates other ways to expand the duct, such a liquid pressure, a low pressure on the outside of the duct and any other way to put the duct in its extended condition.

Figure 4:
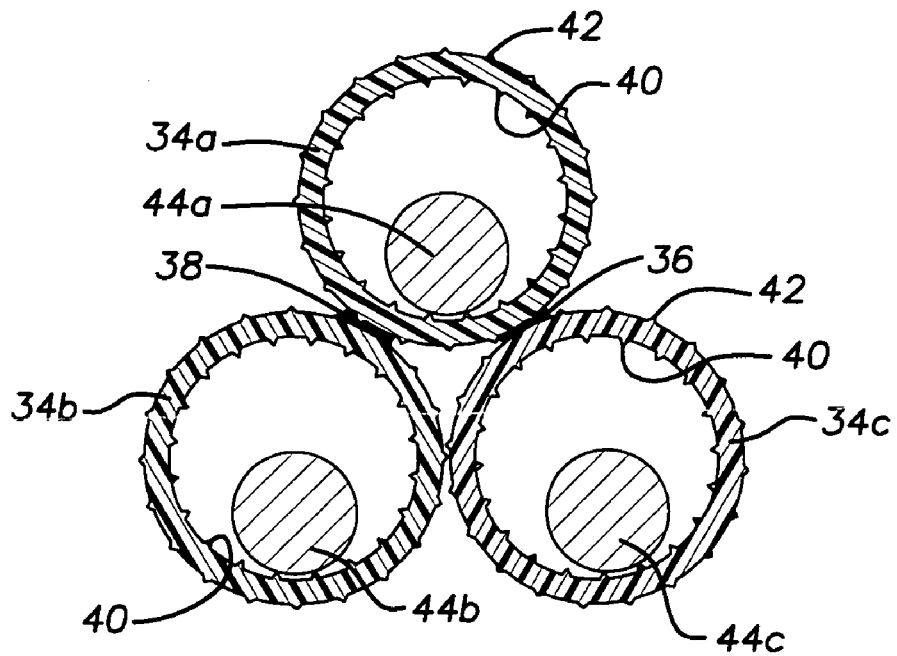
FIG. 4 is front elevation of three ducts joined along their lengths and having ribs.

FIG. 4 illustrates an enhancement of the present invention. As shown in FIG. 4, the ducts 34a, 34b and 34c, if desired, may have internal ribs 40 and/or external ribs 42. The external ribs 42 have the purpose of reducing the frictional forces as the ducts 34a–c are placed in a conduit. The internal ribs 40 similarly reduce the frictional forces as cables 44a–44c are placed in the ducts 34a–34c. The ribs 40 and 42 may have a spiral configuration. The spiral shape and function are described in greater detail in U.S. Pat. No. 5,087,153, incorporated earlier.

The ducts 34a–34c are shown in FIG. 4 in an extended position for illustration purposes. Normally, they would be in a contracted position. The ducts 34a–34c are secured together along their lengths at joints or connections 36 and 38. The connections may extend along the entire lengths of the ducts or be located at spaced intervals. The connections may be made during the molding process, but can be made in any way known in the art, such as heating, fusing, or adhesives. Also, the ducts 34a–34c can be tied together using plastic banding, for example. The connections 36 and 38 prevent or reduce the twisting of the ducts relative to each other as they are strung through a conduit.

Figure 5:
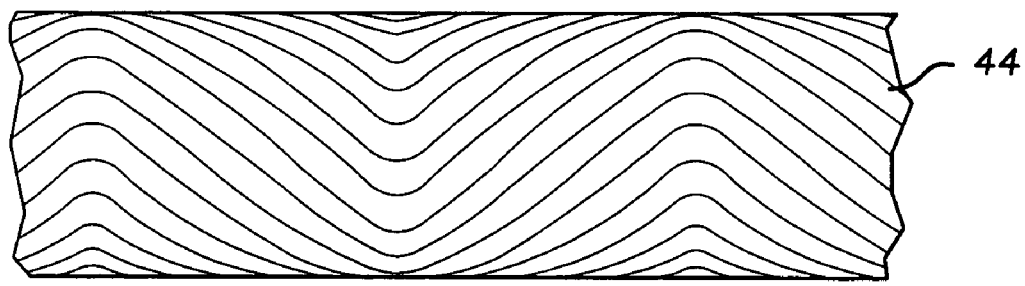
FIG. 5 is a side elevational view of the interior of one of the ducts of FIG. 4.
Figure 6:
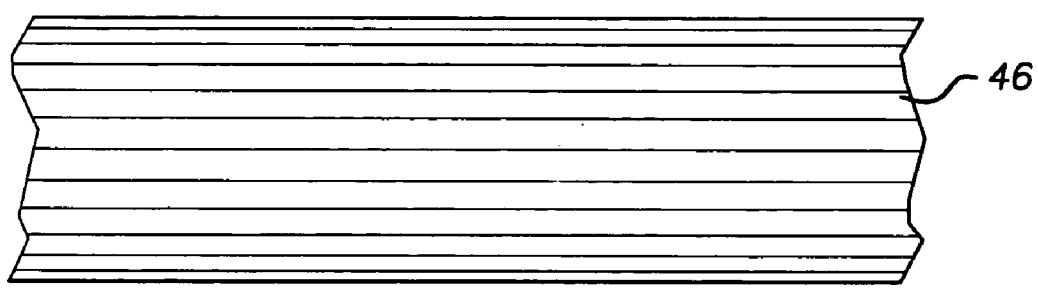
FIG. 6 is an elevational view similar to FIG. 5 of a duct in accordance with another embodiment.

FIG. 5 illustrates an oscillating arrangement of the internal ribs 40. That is, the ribs 40 extend along the interior surface of the duct 34 in a longitudinally directed repeating wave pattern, e.g., a sine wave pattern. In the wave pattern, the ribs extend in alternate circumferential directions as illustrated in FIG. 5. Straight or longitudinal ribs 46 are shown in FIG. 6. The benefits of these ribs are mentioned above and described further in U.S. Pat. No. 5,087,153, which is incorporated by reference.

Another embodiment of a suspended duct 47 is illustrated in FIG. 7 wherein a strand 48 supports a conduit 50 into which two ducts 52 and 54 have been placed. As described earlier, the ducts 52 and 54 are collapsible or flexible. The conduit 50 is also flexible. The ducts 52, 54 and conduit 50 may be formed of the materials described above.

In this embodiment, the conduit 50 is molded to enclose the strand 48. The ducts 52 and 54 may be molded with the conduit 50 or placed therein. The strand 48 is strong enough to support the entire structure between poles or other supports above the ground. A cable 56 is placed in the duct 52 in the same way as described above, that is, by inflating the duct 52 into an extended condition and then letting the duct 52 return its contracted position after the cable is placed therein.

FIG. 8 shows a corrugated duct 60 having an inner layer 62, a reinforcement layer 64 and an outer layer 66. The layers 62, 64 and 66 may be formed of the same materials as described above with respect to such layers. In this embodiment, the outer layer 66 has longitudinal grooves 68 and circumferential grooves 70 formed within the layer thickness.

The grooves 68 and 70 have a depth equal to about 25 to about 75% of the thickness of the layer 66, but other groove depths may be used. Increased groove depth provides greater duct flexibility.

The width of the grooves 68 and 70 is typically much less than the diameter of the duct and, often, may be an order of magnitude less than the diameter. For example, a duct having a 4" ID may have groove widths ranging from about ¹⁄₁₆" to about ⅝" or greater. Also, the grooves may not be of equal or uniform widths. Increasing groove widths will increase the duct flexibility.

The groove spacing or frequency may also be selected to achieve the desired degree of flexibility, with decreasing spacing yielding increasing flexibility. Typical spacing of longitudinal grooves may range from 30 to 60 degrees or more. Axial spacing of circumferential grooves may range from a fraction of the duct diameter to several times the diameter.

In all cases, it should be appreciated that the size, location and frequency of the grooves may be selected to optimize or fine tune the desired flexibility in a given material system. Similarly, it enables increased freedom of material selection and cost advantages since the corresponding restrictions in the resulting flexibility or collapsibility are reduced.

This grooved duct is particularly useful in applications requiring a high degree of duct flexibility in multiple planes or directions. Also, this duct construction is especially useful in mounting arrangements wherein it is attached to members that may expand and contract, causing the duct to do the same thing. Of course, the duct would have to expand and contract without breaking. One such application would be attached to a bridge.

It is possible to place collapsible ducts 10a–g in a conduit 72 during production as shown in FIG. 9. In this embodiment the conduit 72 is corrugated and encloses the ducts 10a–g, shown in their contracted condition. The conduit 72 could be produced and placed on a coil. At the installation site the enclosed ducts 10 would be simply laid with the conduit 72. The cables would be installed as described earlier.

The manufacture of the assembled conduit 72 and ducts 10 as shown in FIG. 9, enables the ducts to be introduced into the conduit under controlled manufacturing conditions. Accordingly, the installation in a tortuous job site configuration is facilitated, if not made possible, by the preassembly of the conduit and ducts.

Figure 10:
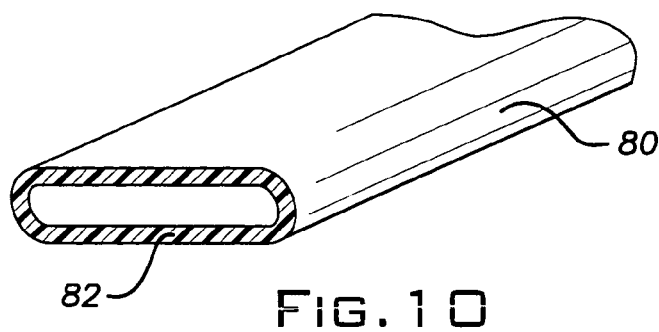
FIG. 10 is a perspective view with parts broken away of a duct in accordance with another embodiment of the invention.
Figure 11:
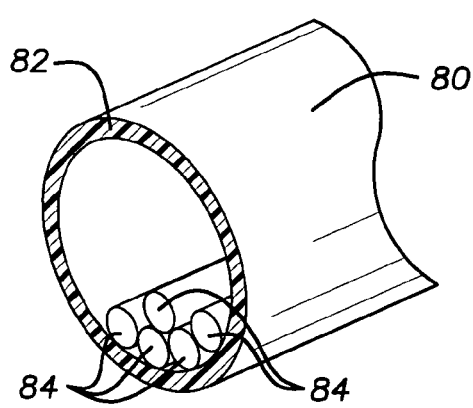
FIG. 11 is a perspective view similar to FIG. 10 showing the duct in an expanded position with cables inserted therein.
Figure 12:
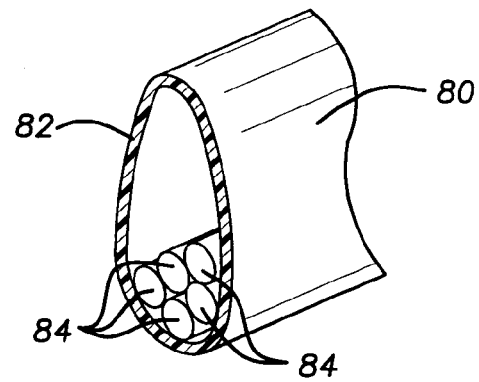
FIG. 12 is a perspective view similar to FIG. 11 showing the duct in a collapsed position surrounding the cables inserted therein.

Referring to FIGS. 10 through 12, a collapsible duct 80 in accordance with another embodiment of this invention is shown. The duct 80 is made of a single layer or wall 82 of a plastic material having a high flexural modulus and tensile strength. An example of a suitable material is polyethylene terephthalate, PET, which has a tensile strength of about 9000 psi. and a flexural modulus of about 350 kpsi.

The use of such a high strength material enables the elimination of a separate reinforcing layer, such as the layer 22 described above, and enables the wall 82 to be formed of a single plastic material that is homogeneous and may be found of a single polymeric material or blends of polymeric materials. Elimination of a separate reinforcing layer simplifies the manufacture of the duct and permits the use of molding techniques such as continuous blow molding, pultrusion, or profile extrusion as well as other known processes that form a tubular product. "Thin walls" as used herein is usually a single layer but may be a laminate or coextrusion with two or more layers. In general, "thin wall" indicates the absence of a thick reinforcement layer.

In accordance with the duct applications completed herein, the thin wall duct 80 usually has a wall thickness of less than 0.01 inches, and preferably, a wall thickness in the range of from about 0.003 to about 0.012 inches although other thicknesses may be possible. The determination of the wall thickness is dependent on the diameter of the duct, the pressure it will encounter, its tensile strength and an appropriate safety factor. Further, the plastic material used to form the duct 80 has a flexural modulus of from about 300 kpsi to about 400 kpsi but, again, may vary. It is desirable to use a material which substantially returns to its original diameter after expansion. The tensile strength of the plastic material should be in the range of from about 5000 psi to about 12000 psi. The tensile strength should be sufficient at the selected duct well thickness to withstand an internal pressure in the range of from about 70 psi to about 120 psi but there should be an appropriate safety factor.

For example, PET characteristics would only require a wall thickness of about 0.002" to withstand 100 psi internal pressure, given a nominal diameter of 0.375 inch. It is estimated that the PET duct would usually have a wall thickness of 0.003 to 0.012 inches but for the purposes intended conceivably could be as thin as 0.0015 and as thick as 0.002 inches. At these and possibly other wall thicknesses the PET would still be flexible and have enough tensile hoop strength to be inserted into the conduit and be able to resist rupture as 100 psi inflation pressure, when the cable is inserted onto it.

Other materials that may be used are polyesters such as polybutylene terephthalate, (PBT), polyamides such as nylon 6, nylon 6,6 and nylon 6,12, polystyrenic polymers such as acrylonitrilebutadienestyrene (ABS), polyacetals, polycarbonates, polyaryletherketones, polytheretherketone, polyetherimide, polyphenylenesulfide, and other resins and/or alloys that could be used to make a thin wall, flexible, high tensile strength collapsible duct that could be inflated and then returned to its collapsed state after a cable was place therein. A micro-cable or mini-cable as it is sometimes called (e.g. a cable having a diameter normally less than 0.25" up to about 0.38" or slightly larger.) would commonly be used with the thin wall duct.

In view of the forgoing parameters, one skilled in the art may select appropriate combinations of wall thicknesses, and plastic materials to enable wall ducts in accordance with the invention. That is, the plastic material and wall thickness may be selected to provide the flexibility, hoop strength and material stability required for a particular duct application.

Another significant advantage of the thin wall duct is that it can be molded quickly and efficiently by extrusion and placed in the conduits at the time of manufacture or after the conduits are in place.

The duct 80 is shown in a fully collapsed condition in FIG. 10. As shown, the duct 80 may be manufactured so that in its normal condition it has a flattened oval shape cross section.

Referring to FIG. 11, the duct 80 is shown in an expanded condition and has a substantially oval or near circular cross section. As described above, the duct may be biased to its expanded condition by an internal pressure. Upon expansion of the duct 80, it is convenient to insert one or more cables 84 which may comprise fiber-optic cables.

Following insertion of the cables 84, the duct 80 may be collapsed or allowed to return to its reduced cross-sectional area as shown in FIG. 12. The collapsed duct 80 containing cables 84 has a substantially reduced cross-sectional area as compared with prior art non-collapsible ducts.

The single thin wall embodiment has the ability to include many more ducts in a conduit than an expanded duct or even a collapsed multilayer duct. Because the walls are thinner, and the flattened tubes are small, in volume, a 1" conduit could hold fourteen (14) 10 mm ducts, a 1¼" conduit could hold twenty-four (24) ducts and a 1½" conduit could hold forty-eight (48) ducts of the thin wall variety. These capacities still allow enough free room to insert a cable and are a magnitude greater than ever before achieved.

The significance of the thin wall version is tremendous when one considers the installation process, the environment and the structure of the ducts in the conduit. The process of placing ducts in a conduit would be greatly shortened, since many more ducts could be pulled through a conduit at one time. Because the number of conduits may be limited, the thin wall version of the expandable ducts could Moreover, some conduits are aerial and it is desirable to use smaller diameter conduits to lessen the wind and ice forces on them. Again, many more thin walled ducts could be placed in a smaller conduit. There would also be less expansion and contraction problems with the thin wall version.

Another advantage of the thin wall version is its light weight and flexibility. The light weight is an advantage in aerial installations. The flexibility of the duct 80 is particularly advantageous when placing the ducts in a serpentine conduit.

Figure 13:
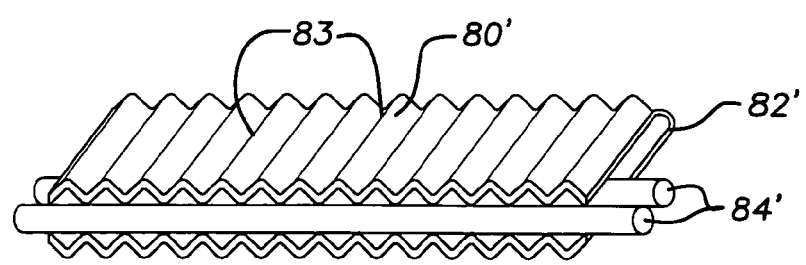
FIG. 13 is a sectional elevational view showing a duct having a corrugated shape and cables inserted therein accordance with another embodiment of the invention.

The duct flexibility may be further enhanced by molding a slight corrugation into the duct in the manufacturing process. It is also possible to later corrugate a duct formed with a smooth wall. As shown in FIG. 13, the wall of the duct 80' may be corrugated to provide a more flexible duct 80. The wall of the duct is corrugated by permanently or plastically deforming the plastic along fold or pivot lines 83 in the wall 82' of the duct as by passing it through a gear or other suitable device. It should be appreciated that the pivot lines 83 may be straight or curved, and may extend in a cross direction as shown, or in a longitudinal direction, or in both directions. Following corrugation, the duct 80' may be expanded in the same manner as the duct 80, cables 84', may be inserted in the expanded duct, and the duct 80' may then be allowed to return to its normal collapsed condition as shown in FIG. 13.

Of course, the ducts 80 and 80' may be inserted into the conduit 24 as shown in FIG. 3 in connection with ducts 10a–10g. The thin walls 82 and 82' of the ducts 80 and 80' should enable even greater numbers of ducts to be inserted in the conduit.

The light weight, small collapsed volume and flexibility of the thin wall ducts would also allow installation of them into conduits that already have other ducts in them. Thus, the work of laying additional conduits in place would be avoided.

Figure 14:
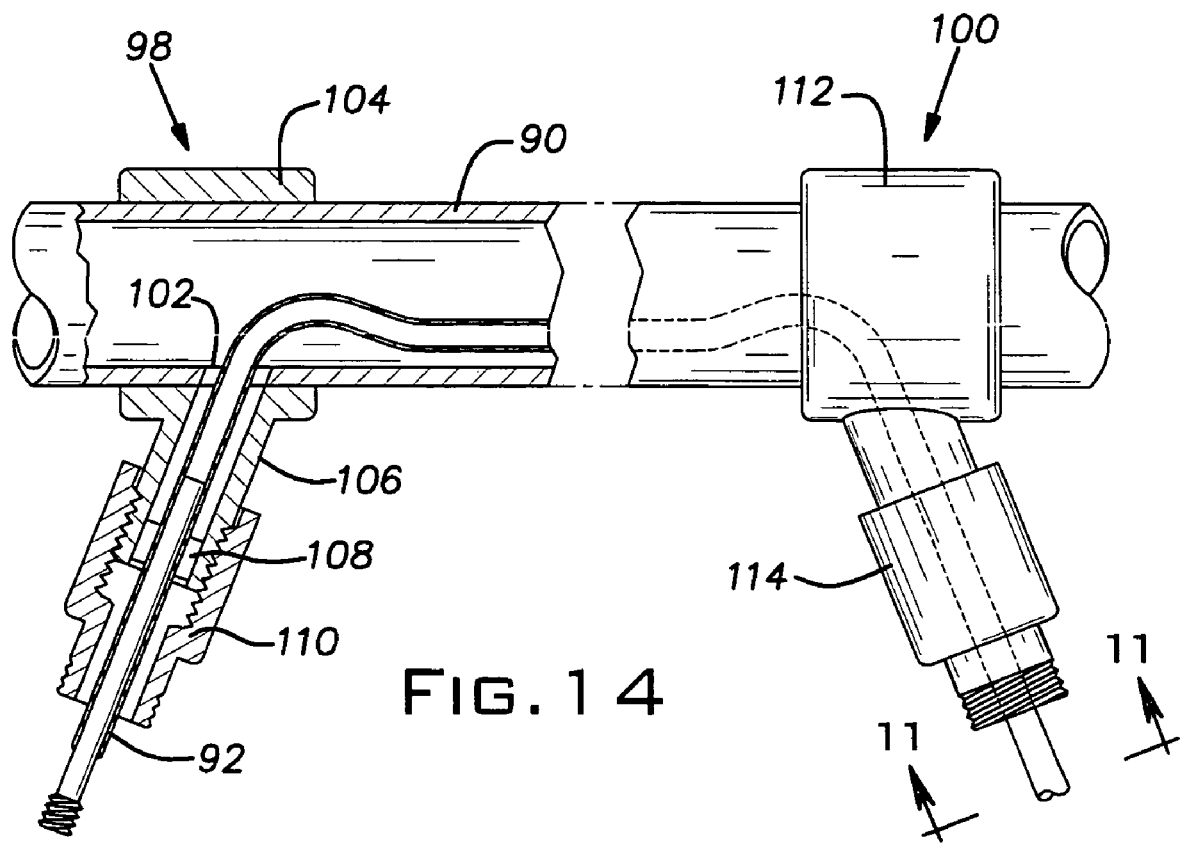
FIG. 14 is an elevational view, partly in section, showing another embodiment wherein a duct in accordance with the invention is mounted within a utility service line.
Figure 15:
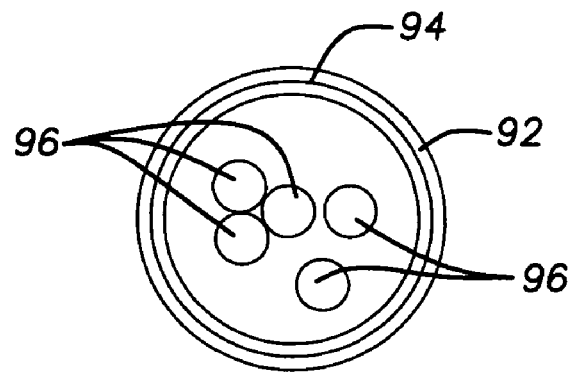
FIG. 15 is a sectional view, on an enlarged scale, taken along the line 11—11 in FIG. 10.

Referring to FIGS. 14 and 15, a service line 90 for providing a utility service such as natural gas or water is shown. The service line 90 is of conventional construction and may be a rigid or flexible pipeline formed of a suitable material, for example, plastic. As shown in FIG. 14, a duct 92 is mounted within a portion of the service line 90.

The duct 92 is similar to the ducts or conduits 24, 47, 60, 72, 80 and 80' described above. Accordingly, the duct 92 has a collapsible or flexible wall 94 of multilayer construction. At least the outermost layer of the wall 94 provides a fluid tight seal and is substantially inert to the water or gas utility being supplied in the line 90. In this manner, the gas or water is separated and isolated from cables 96 contained within the duct 92.

The duct 92 is introduced into the service line 90 at an entrance location 98 which may, for example, be near the utility street supply line. The duct 92 is withdrawn from the service line 90 at an exit location 100 just before the service line goes into the meter riser. In this manner, the service line 90 provides a low-cost pathway to the home or business.

At the entrance location 98, an opening 102 in the wall of the service line 90 communicates with a surface mount clamp 104 arranged to receive the duct 92 with a fluid tight seal. To that end, the clamp 104 includes a nozzle 106 through which the duct 92 passes as it is introduced into the service line 90. The nozzle 106 includes a ferrule seal 108 which may be sealed against the duct 92 by tightening a locking nut connector 110. The ferrule seal 108 encircles the duct 92 and is sufficiently compressed upon tightening of the connector 110 to form a continuous seal along the outer surface of the duct 92 when the latter is in the contracted condition.

At the exit location 100, an opening (not shown) similar to the opening 102 is provided in the wall of the service line 90 together with a second surface mount clamp 112 having a locking nut connector 114 operable to cause a second ferrule seal 108 (not shown) to engage the duct 92 with a fluid tight seal as the duct exits the service line 90.

In an illustrative example, the service line 90 comprises a one inch diameter plastic natural gas supply line to a residential home. The duct 92 has a polyurethane outer layer, a ⅜ inch outer diameter in the extended condition and contains a plurality of fiber-optic cables 96. With the gas service interrupted and the line 90 free of residual gas, the collapsed duct 92 is strung through the service line 90 using known techniques. The opposite ends of the duct 90 respectively extend from the clamps 104 and 112.

In the same manner as described above, the duct 92 is expanded and the cables 96 mounted therein. The duct 92 is then contracted in order to minimize the duct cross-sectional area and its effect on the service line 90. The opposite end portions of the duct 92 are then engaged in fluid tight seals by tightening the locking nut connectors 110 and 114. These seals close the service line, and the gas supply through the line 90 may be resumed.

Although particular embodiments of the invention have been described in detail, it is understood that the invention is not limited correspondingly in scope but includes all changes and modifications coming within the spirit and terms of the claims appended hereto.

What is claimed is:

1. A conduit having a conduit space containing a longitudinally extending duct system providing an inner pathway separate from said conduit space for receiving a cable, said duct system having a longitudinal axis and a closed duct wall extending about said axis to form said inner pathway, said duct wall including a collapsible wall extending longitudinally within said conduit, said collapsible wall being movable between an extended condition to provide said duct system with a first cross-sectional area and a contracted condition to provide said duct system with a second cross-sectional area smaller than said first cross-sectional area.

2. A conduit as in claim 1, wherein said collapsible wall is normally in said contracted condition and forms a major circumferential portion of said duct wall.

3. A conduit as in claim 2, wherein said collapsible wall forms substantially all of said closed duct wall.

4. A conduit having a longitudinally extending duct system, said duct system including a plurality of ducts forming a plurality of inner pathways for receiving cable, said duct system including a collapsible wall extending longitudinally within said conduit, said collapsible wall being movable between an extended condition to provide said duct system with a first cross-sectional area and a contracted condition to provide said duct system with a second cross-sectional area smaller than said first cross-sectional area.

5. A conduit as in claim 4, wherein said plurality of ducts are secured together along their longitudinal lengths to form a duct assembly, said duct assembly extending in said conduit with said collapsible walls in said contracted condition.

6. A conduit as in claim 2, wherein said collapsible wall has a multiple layer construction including an outer protective layer, an inner liner layer for engaging said cable, a reinforcing layer extending between said outer layer and liner layer for increasing the hoop strength of said collapsible wall.

7. A conduit as in claim 6, wherein said liner layer has a profiled surface to decrease frictional resistance as said cable is inserted in said duct system.

8. A conduit as in claim 7, wherein said profiled surface includes longitudinal ribs, oscillating ribs or spiral ribs.

9. A conduit as claim 1, wherein said conduit is a pipeline.

10. A pipeline having a longitudinally extending duct system providing an inner pathway for receiving a cable, said duct wall including a collapsible wall extending longitudinally within said conduit, said collapsible wall being movable between an extended condition to provide said duct system with a first cross-sectional area and a contracted condition to provide said duct system with a second cross-sectional area smaller than said first cross-sectional area, said pipeline including a wall having an inlet opening for receiving said duct system, clamp means mounted to said pipeline and having an adjustable opening communicating with said inlet opening for receiving and introducing said duct means into said pipeline, said adjustable opening being operable between a clearance position and a sealing position, said adjustable opening in said clearance position receiving said duct system with sufficient clearance to insert said duct system into said pipeline and to insert said cable into said duct system when said wall is in said extended condition, said adjustable opening in said sealing position engaging said duct with said wall means in said contracted condition in a fluid tight seal and sealing said inlet opening with said duct means and cable extending there through into said pipeline.

11. A conduit as in claim 10, wherein said inlet opening is located at an entrance location for said duct means in said pipeline, said pipeline has an outlet opening extending through said pipeline wall at an exit location for said duct system in said pipeline, a second clamp is mounted to said pipeline at said exit location with a second adjustable opening communicating with said outlet opening, said second adjustable opening also being operable between a clearance position and a sealing position, said duct system and cable extending into said pipeline through said first adjustable opening at said entrance location, through said pipeline to said exit location and exiting from said pipeline through said second adjustable opening at said exit location, whereby said adjustable openings in said sealing positions engage said duct system with said wall in said contracted condition in fluid tight seals and thereby seal said pipeline.

12. A conduit as claim 11, wherein said pipeline is a utility service line.

13. A duct for providing an inner pathway for receiving a cable within a conduit having a conduit space surrounding said duct, said duct having a longitudinal axis and a closed duct wall extending about said axis, said duct wall including a collapsible wall movable between an extended condition to provide said duct with a first cross-sectional area and a normally contracted condition to provide said duct with a second cross-sectional area smaller than said first cross-sectional area, said collapsible wall having a multiple layer construction including an outer protective layer, an inner liner layer for engaging said cable, a reinforcing layer extending between said outer layer and liner layer for increasing the hoop strength of said collapsible wall, said collapsible wall being formed of at least one or more layers that provide said collapsible wall with a flexural modulus and a tensile strength sufficient in said contracted condition to insert said duct into said conduit and thereby enable a greater number of ducts to be inserted in the conduit as compared with the number of similar sized ducts not having collapsible walls that could be inserted in the conduit.

14. A duct as set forth in claim 13, wherein said duct has a tubular shape and a generally oval or circular cross-section when said collapsible wall is in the extended condition and a flattened tubular shape and a generally oval cross-section when said collapsible wall is in the contracted condition.

15. A duct as in claim 14, wherein said liner layer has a profiled surface to decrease frictional resistance as said cable is inserted in said duct, said profiled surface including longitudinal ribs.

16. A duct as in claim 14, wherein said profiled surface includes longitudinal ribs, oscillating ribs or spiral ribs.

17. A plurality of ducts for providing inner pathways for receiving a plurality of cables, each of said ducts having a longitudinal axis and a duct wall extending about said axis, said duct walls including a collapsible wall portion movable between an extended condition to provide said ducts with a first cross-sectional area and a contracted condition to provide said ducts with a second cross-sectional area, said second cross-sectional area being smaller than said first cross-sectional area, said ducts being connected longitudinally along their exteriors to reduce relative movement between the ducts.

18. The plurality of ducts of claim 17, wherein the ducts have exterior ribs to reduce friction as they are placed in a conduit.

19. The plurality of ducts of claim 17, wherein the ducts have interior ribs to reduce friction as cables are pulled into the ducts.

20. The plurality of ducts of claim 19, wherein the ribs are longitudinal.

21. The plurality of ducts of claim 19, wherein the ribs extend in one direction then another.

22. The plurality of ducts of claim 17, which further includes a strand of material attached along the length of said ducts by which they may be suspended.

23. The plurality of ducts of claim 22, wherein the strand of material is enclosed in an outer layer that also encloses the ducts and forms a conduit.

24. A thin wall duct for providing an inner pathway for receiving a cable within a conduit having a conduit space surrounding said duct, said thin wall duct having a longitudinal axis and a closed duct wall extending about said axis to form said inner pathway separate from said conduit space, said duct wall including a collapsible wall movable between an extended condition to provide said thin wall duct with a first cross-sectional area and a normally contracted condition to provide said thin wall duct with a second cross-sectional area smaller than said first cross-sectional area, said collapsible wall having at least a single layer construction having a high flexural modulus and a high tensile strength, said collapsible wall being formed of at least one or more layers that provide said collapsible wall with a flexural modulus and a tensile strength sufficient to insert said duct in said contracted condition into said conduit and thereby enable a greater number of ducts to be inserted in the conduit as compared with the number of similar sized ducts not having collapsible walls that could be inserted in the conduit.

25. The thin wall duct of claim 24 wherein said duct wall is a single wall and has a thickness of between 0.003" and 0.012".

26. The thin wall duct of claim 25 wherein said duct wall is formed of a plastic having a flexural modulus of about 350 kpsi and a tensile strength of from about 5000 psi to about 12,000 psi.

27. The thin wall duct of claim 26 wherein said duct wall is formed of polyethylene terephthalate.

28. The thin wall duct of claim 25 wherein said duct wall is formed of a plastic selected from the group consisting of polyesters, polyamides, styrenic , polycarbonates, polyaryletherketone, polytherimede, and polyphenylenesulfides.

29. The thin wall duct of claim 24 wherein said duct wall is corrugated.

* * * * *

UNITED STATES PATENT AND TRADEMARK OFFICE
CERTIFICATE OF CORRECTION

PATENT NO. : 7,182,104 B2 Page 1 of 1
APPLICATION NO. : 10/865085
DATED : February 20, 2007
INVENTOR(S) : Robert B. Washburn It is certified that error appears in the above-identified patent and that said Letters Patent is hereby corrected as shown below:

Column 12, line 44 (claim 28, line 3), after "styrenic" insert --polymers--.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,182,104 B2 | Page 1 of 1 |
| APPLICATION NO. | : 10/865085 | |
| DATED | : February 27, 2007 | |
| INVENTOR(S) | : Robert B. Washburn | |

It is certified that error appears in the above-identified patent and that said Letters Patent is hereby corrected as shown below:

Column 12, line 44 (claim 28, line 3), after "styrenic" insert --polymers--.

This certificate supersedes the Certificate of Correction issued March 18, 2008.

Signed and Sealed this

Fifteenth Day of April, 2008

JON W. DUDAS
*Director of the United States Patent and Trademark Office*